(12) United States Patent
Beyer

(10) Patent No.: US 9,187,254 B2
(45) Date of Patent: Nov. 17, 2015

(54) METHOD AND TRANSPORT DEVICE FOR RETURNING EMPTY PACKAGING, PARTICULARLY BOTTLES AND CANS

(75) Inventor: Dieter Beyer, Friedersdorf (DE)

(73) Assignee: Envipco Holding N.V., Amersfoort (NL)

( * ) Notice: Subject to any disclaimer, the term of this patent is extended or adjusted under 35 U.S.C. 154(b) by 141 days.

(21) Appl. No.: 14/006,218

(22) PCT Filed: Mar. 26, 2012

(86) PCT No.: PCT/DE2012/000312
§ 371 (c)(1),
(2), (4) Date: Sep. 19, 2013

(87) PCT Pub. No.: WO2012/130218
PCT Pub. Date: Oct. 14, 2012

(65) Prior Publication Data
US 2014/0014478 A1 Jan. 16, 2014

(30) Foreign Application Priority Data
Mar. 26, 2011 (DE) .......... 10 2011 015 239

(51) Int. Cl.
B65G 47/24 (2006.01)
B65G 19/02 (2006.01)
B07C 5/02 (2006.01)
B07C 5/12 (2006.01)
B07C 5/342 (2006.01)
G07F 7/06 (2006.01)

(52) U.S. Cl.
CPC . *B65G 19/02* (2013.01); *B07C 5/02* (2013.01); *B07C 5/122* (2013.01); *B07C 5/3422* (2013.01); *G07F 7/0609* (2013.01)

(58) Field of Classification Search
CPC . G07F 7/069; B07C 2501/0081; B07C 5/126; B07C 5/02; B07C 5/3422; B65G 19/02; B65G 47/00; B65G 47/12; B65G 2201/0244; B65G 19/10; B65G 19/20; B65G 19/22; B65G 19/2201
USPC .......... 198/728, 370.07, 395, 397.01, 397.05, 198/779
See application file for complete search history.

(56) References Cited

U.S. PATENT DOCUMENTS 3,331,486 A * 7/1967 Towry ........................... 198/380
4,713,536 A * 12/1987 Williams et al. .......... 250/223 B
8,729,455 B2 5/2014 Kulki et al.
8,813,938 B2 8/2014 Handschick
8,910,567 B2 12/2014 Moch et al.

(Continued)

*Primary Examiner* — Gene Crawford
*Assistant Examiner* — Lester Rushin
(74) *Attorney, Agent, or Firm* — Shlesinger, Arkwright & Garvey LLP

(57) ABSTRACT

The present invention relates to a method for returning empty packaging, particularly bottles and cans, having a bulk import, in which the empty packaging is routed out of an input chamber through a transport device, rotating the empty packaging along its longitudinal axis past a recognition unit. The transport device for carrying out the method has a plurality of rollers which are arranged transversely with respect to the direction of transport and act as carriers for the empty packaging. The empty packaging is supplied to the detection array of the recognition unit in a field array. To avoid empty packaging being conveyed on top of other empty packaging, thereby blocking the detection of the bottom empty packaging by the recognition unit, the empty packaging undergoes a brief reversal of direction of rotation before its presentation to the detection array.

16 Claims, 2 Drawing Sheets

(56) References Cited

U.S. PATENT DOCUMENTS

| | | |
|---|---|---|
| 2011/0259714 A1 | 10/2011 | Handschick et al. |
| 2012/0017782 A1 | 1/2012 | Moch et al. |
| 2012/0118700 A1 | 5/2012 | Handschick et al. |
| 2012/0260811 A1 | 10/2012 | Schulenberg et al. |
| 2013/0248716 A1 | 9/2013 | Kulcke |
| 2013/0299304 A1 | 11/2013 | Handschick |
| 2014/0048391 A1 | 2/2014 | Beyer |

* cited by examiner

METHOD AND TRANSPORT DEVICE FOR RETURNING EMPTY PACKAGING, PARTICULARLY BOTTLES AND CANS

RELATED APPLICATIONS

This application is a national stage application of International Application No. PCT/DE2012/000312, filed Mar. 26, 2012, which claims benefit of German Application No. 10 2011 015 239.3, filed Mar. 26, 2011, the disclosures of each of which are hereby incorporated by reference.

DESCRIPTION

1. Field

The disclosed embodiments relate to a method and a transport device for returning empty packaging, particularly bottles and cans.

2. Background

Various methods and transport devices are known in the art and are used with empty packaging return machines. With the help of said machines, disposable and reusable containers in the form of bottles and cans are returned, for example, for recycling or disposal. A distinction is made between single collection systems and bulk collection systems.

An example of an empty packaging return machine with single collection system is described, for example, in WO 02/12095 A1. With said machines, the containers are inserted serially by hand, one after the other, and then guided by a transport device serially, i.e., in a row, one after the other, past a recognition unit that checks the containers for form, properties, intactness, as well as barcodes or special symbols.

Empty packaging return machines with bulk collection systems are described, for example, in DE 10 2005 025 965 A1; DE 10 2004 010 133 A1; and DE 103 35 188 A1 With said machines, empty packaging to be returned is not inserted singly, i.e., piece by piece, but rather in bulk. The empty packaging, in bulk, is inserted into an input chamber, and then the empty packaging is transported out of said input chamber by the transport device. With most of the machines known from prior art, the empty packaging is serially separated in the input chamber and then, as with the single collection system, guided by the transport device past a recognition unit, which individually detects the information on the empty packaging one-by-one.

The bulk collection systems briefly described above have the advantage that the user can place the empty packaging into the machine quickly and generally without any problems. What is a disadvantage, however, is that despite relatively high single transport rates of the empty packaging, the throughput through the machine takes too much time because of the serial separation, and the customer therefore has to wait a relatively long time until the deposit receipt is printed.

This disadvantage may be remedied with a solution known from DE 10 2008 052 330 A1, which relates to a method and a corresponding device for the return of empty packaging, particularly of bottles and cans, with a bulk collection system where the empty packaging rotates about its longitudinal axis as it is coming out of an input chamber and is guided past a recognition unit by a transport device. The transport device parallelizes the empty packaging coming out of the input chamber and guides it to a detection array of the recognition unit in an array arrangement. An array arrangement means that the empty packaging is arranged on the transport device in the direction of conveyance not only successively on in front of one another and/or one behind the other, but simultaneously also side-by-side. The transport device has a plurality of catches, which are arranged transversely to the direction of transport and spaced apart, and which rotate around a support surface of the transport device. The catches may be rollers that are driven counter-clockwise. Using this system, the empty packaging conveyed out of the input chamber is positioned on said rollers and simultaneously supported at the support surface. Because of said measures, the throughput of the empty packaging through a return machine is increased significantly.

The operation of a return machine operating according to the method described above has shown that during the parallelization of the empty packaging coming out of the input chamber, the empty packaging is occasionally not only positioned on a roller side-by-side, but also on top of one another, which makes an orderly checking of the empty packaging impossible.

Therefore, a need exists for a method and a transport device for the return of empty packaging, particularly bottles and cans, to remedy the positioning of empty packaging on top of one another on the rollers functioning as catches.

SUMMARY

In certain embodiments, the direction of rotation for at least one roller circulating around the support surface is temporarily reversed in the area between the input chamber and the detection array. In certain embodiments, the short-time reversal of direction is from counter-clockwise to clockwise. Surprisingly, it was shown that this simple measure leads to a dependable correction of the positioning of the empty packaging on the rollers. That is, if empty packaging is positioned on top of one another on a roller, the empty packaging that is on top drops back into the input chamber. Therefore, the empty packaging is properly guided to the detection array only in side-by-side and/or in front of and behind positions on a roller.

With respect to the device, reversing the direction of rotation is achieved in that the rollers are rotatably supported at both sides on chain drives that rotate around the support surface, and that the rollers extend over each side of a catch area into projection areas. In these projection areas, said rollers sit close to rails such that the rotary drive is supplied by frictional engagement or positive locking with the rails. Relative to the chain drives, the rails are arranged at the sides of the support surface, with one rail on each side of the support surface, e.g., with one rail on in each projection area. At the area between the input chamber and the detection array, the rails are interrupted, such that a reversal of the direction of rotation of at least one roller occurs. For this reason, additional rails are be arranged in the area above the rollers, with the rollers sitting close enough to said rails to be rotatably driven with frictional engagement or positive locking.

In certain embodiments, each roller has a respective segment with a diameter that is smaller than the diameter of the segment of the rollers on which the empty packaging is positioned, with the smaller diameter segments of the rollers sitting close enough to rails in the area of the detection array to be rotatably driven under frictional engagement or positive locking. Relative to the chain drives, one rail is located at each longitudinal side of the support surface. Because of the smaller diameter segments of the rollers, the rotational rate of the empty packaging increases in the area of the detection array, which may advantageously leads to a shorter height required for the detection array.

In certain embodiments, the rollers may have alternating larger and smaller diameter segments in the catch area, with the empty packaging being supported on the larger diameter segments. The catching of the empty packaging is then less prone to failure. In particular, with the larger and smaller diameter segments of the rollers, the empty packaging cannot get stuck between the rollers and the support surface.

In certain embodiments, the transport device is a bulk conveyor. In certain embodiments, the bulk conveyor has an angle of incidence a of approximately 60° to 85°. On the one hand, this decreases the structural depth of the return machine. On the other hand, it was shown that in the stated range of the angle of incidence, reversing the direction of rotation of the rollers was especially effective in the correction of the positioning of empty packaging on the rollers.

Additional objects and advantages of the disclosed embodiments will be set forth in part in the description which follows, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various embodiments and aspects of the disclosed embodiments. Together with the description, the drawings serve to explain the principles of the disclosed embodiments. In the drawings.

DETAILED DESCRIPTION

Reference will now be made in detail to disclosed embodiments, examples of which are illustrated in accompanying drawings. Whenever convenient, the same reference numbers will be used throughout the drawings to refer to the same or like parts.

Figures 1, 2:
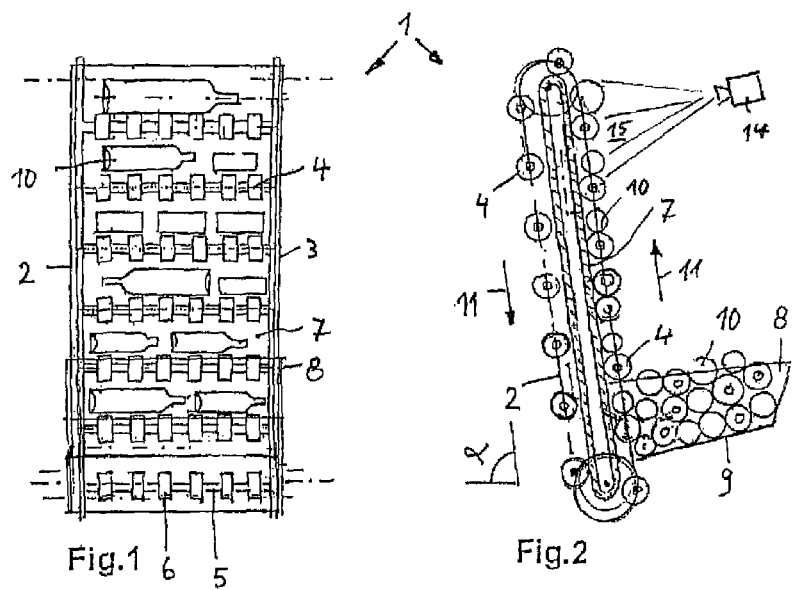
FIG. 1 illustrates a frontal view of a transport device according to the disclosed embodiments.
FIG. 2 illustrates a lateral view of the transport device of FIG. 1.
Figure 3:
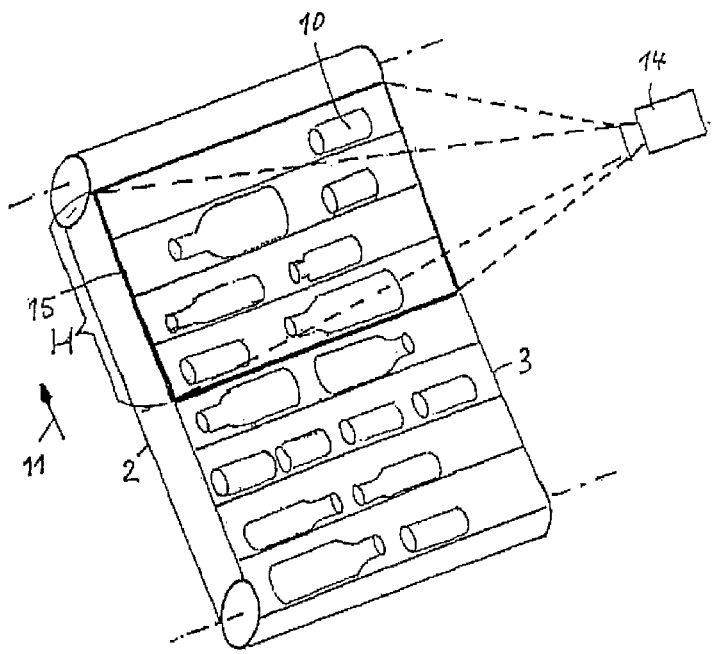
FIG. 3 illustrates a perspective view of the transport device with a detection array of a camera associated with a recognition unit.
Figure 5:
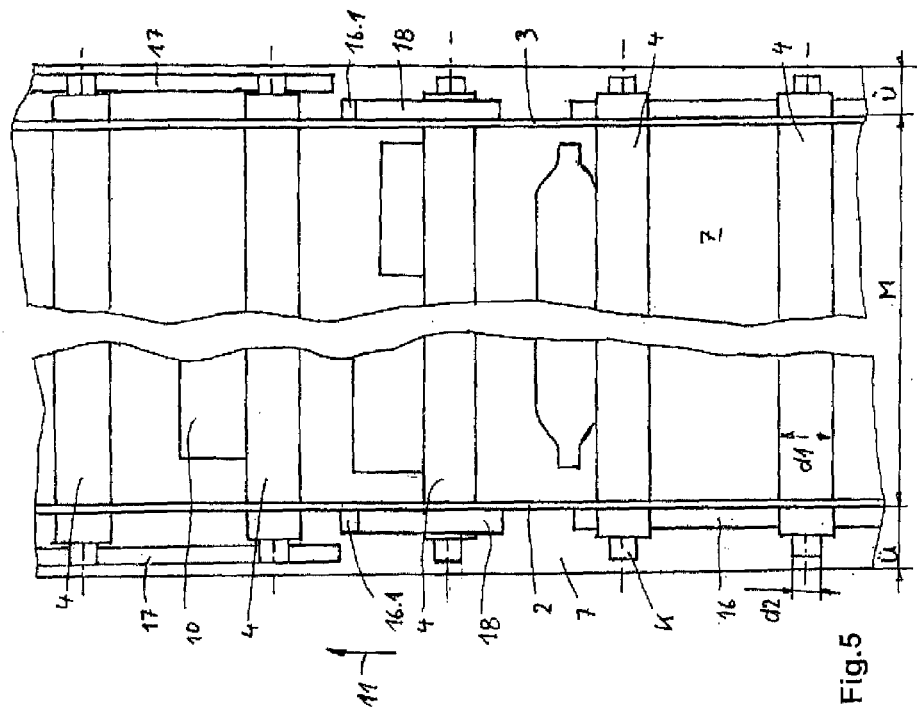
FIG. 5 illustrates a top view of the representation according to FIG. 4.
Figure 4:
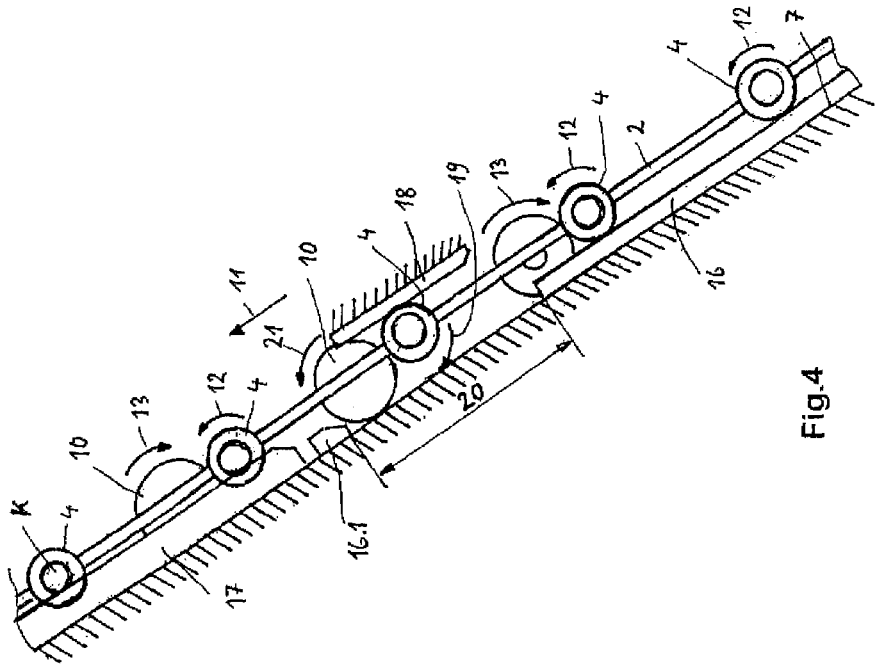
FIG. 4 illustrates a sectional lateral view of the transport device in an enlarged representation as compared to FIGS. 1-3.

By way of introduction, it should be noted that in FIGS. 1-3, the means for the rotary drive of rollers 4 that function as catchers shown in FIGS. 4 and 5 were omitted for reasons of clarity.

FIG. 1 shows bulk conveyor 1 of an empty packaging return machine (otherwise not shown). In said embodiment example, the angle of incidence a of the bulk conveyer 1 is in a range of 60° to 85°. On its two longitudinal sides, it has circulating chain drives 2, 3 on which rollers 4, arranged transversely to the conveying direction, are rotatably supported. As shown in FIG. 1, rollers 4 are rotatably spaced evenly over the circumference of chain drives 2 and 3 and have alternating segments 5, 6 of greater and smaller diameters (in FIG. 5 this type of subdivision of rollers 4 is not shown).

A funnel-shaped input chamber 8, which is open toward the top, is located at the lower end of bulk conveyor 1. Base 9 of input chamber 8 runs in a downward tilted fashion toward bulk conveyor 1. Empty packaging 10, such as cans and bottles, may be poured in bulk into input chamber 8 from, for example, a bag. Because of the tilt of base 9, there is a momentum that causes empty packaging 10 to roll and/or slide toward bulk conveyor 1. Rollers 4 of bulk conveyor 1 run through input chamber 8, catching empty packaging 10 positioned on the larger diameter segments 6 of rollers 4. Rollers 4 may be wide enough so that at least two pieces of empty packaging 10 can be positioned side-by-side on roller 4.

Bulk conveyor 1 conveys empty packaging 10 out of input chamber 8 and upward. At the upper end of bulk conveyor 1, empty packaging 10 is then transferred to subsequent means of the return machine (not shown). In the drawing, the conveying direction is shown by arrows 11. Rollers 4 run along rigid, stationary support surface 7 for conveyed empty packaging 10. Rollers 4 are longitudinally driven by chain drives 2 and 3 along stationary support surface 7. On both sides, rollers 4 project over catching area M. Catching area M is located in the space between chain drives 2 and 3. As shown in FIG. 5, rollers 4 are rotatably driven with frictional engagement in the projection areas Ü.

As shown in FIG. 5, rollers 4 may catch empty packaging 10 with their segment of diameter d1 when going through input chamber 8 such that empty packaging 10 is positioned in catching area M. As shown in FIG. 5, rollers 4 are frictionally engaged by stationary rails 16 that are mounted on support surface 7, which is also stationary. In that way, rollers 4 are driven counter-clockwise by the frictional engagement with stationary rails 16, as shown by arrow 12 in FIG. 4. Empty packaging 10 positioned on rollers 4 is therefore driven clockwise, as indicated in FIG. 4 by an arrow 13. Because of said direction of rotation 13, empty packaging 10 is pressed to support surface 7 and can therefore not fall off rollers 4.

Bulk conveyor 1 guides empty packaging 10 in said rotating fashion past camera 14 of a recognition unit, as shown in FIG. 3 (with input chamber 8 and rollers 4 omitted) and in FIG. 2. Camera 14 has a two-dimensional detection array 15. In some embodiments, detection array 15 comprises the entire width of bulk conveyor 1, and the height H of the detection array 15 may be selected so that it corresponds at least to the traveled surface area of the empty packaging 10 with the largest diameter. In this way, all identification, barcodes or other image characteristics on the surface of empty packaging 10 can be collected with certainty. Camera 14 may be arranged above bulk conveyor 1 with appropriate functional lighting, and at an appropriate angle and distance that camera 14 can therefore opto-electronically record all symbols, etc. on the circumference of rotating empty packaging 10 during the upward transport in real-time. In certain embodiments, a camera unit can monitor the overall arrangement, and its images can be used for specific service measures.

Rollers 4 may each have in their projection areas Ü a respective segment K, which has a smaller diameter d2 than rollers 4 in catching area M. With segments K, rollers 4 run with frictional engagement on stationary rails 17 mounted on the support surface 7, which is also stationary. Because of the smaller diameter of segments K, rails 17 are correspondingly higher than rails 16. This means that rollers 4 have the same direction of rotation here as in the area of rails 16, but because of the smaller diameter of segment K, the frictional drive causes their rotational speed to be higher. As a result, the height H required to ensure that empty packaging 10 is fully rotated while in the detection array 15 is reduced. If an increase of the rotational speed is not required, segments K of projection areas Ü can be omitted; that is, the rollers may have the same diameter in projection area Ü as in catching area M. And, if the rollers have the same diameter in both projection area Ü and catching area M higher rails 17 may be replaced by less high rails 16.

When empty packaging 10 is conveyed out of input chamber 8, it may happen that empty packaging 10 is not only positioned side-by-side on roller 4, but also on top of one another. In that case, a proper collection of the identification etc. on the shell of empty packaging 10 would not be possible. To remedy any such accumulation on rollers 4, if necessary, there may be a short-time reversal of the direction of rotation for one or more rollers 4 that is circulating around the surface area 7. In some embodiments, the short-time reversal of the direction of rotation and is occurs in the area between input chamber 8 and detection array 15. This occurs in that space 20 is provided between rails 16 and 17 on each side of catching area M, and/or if rails 16 are also used in the area of the detection array 15, as described above, an interruption is provided between rails 16 in the detection area and rails 16 outside of the detection area. In space 20 and/or the interruption, another set of rails 18 is arranged in a stationary fashion above rollers 4, on which rollers 4 roll off with frictional engagement. In some embodiments, rollers 4 frictionally engage with rails 18 with their diameter d1 segments. As shown in FIG. 4, rollers 4 then rotate clockwise, as indicated by arrow 19. Because of the frictional engagement of rollers 4 with rails 18 that causes rollers 4 to reverse their direction of rotation, the direction of rotation of empty packaging 10 also reverses, and it now rotates counter-clockwise, as shown symbolically in FIG. 4 by arrow 21. Because of said reversal of the direction of rotation, any empty packaging 10 lying on top when rollers 4 are populated with layers of empty packaging 10 will drop back into input chamber 8 and is then conveyed again from there.

Before rollers 4 roll onto rails 17, a brief continuation piece 16.1 of rails 16 may be arranged in space 20 before the start of the rails 17, which effects a reversal in the direction of rotation 13 of empty packaging 10 before the circumferential speed in said direction of rotation 13 is increased when rollers 4 come into contact with rails 17.

The invention claimed is:

1. A transport device for the return of empty packaging comprising:
   an input chamber;
   a plurality of rollers rotatably supported at each end by a chain drive, wherein the chain drive circulates the rollers around a support surface of the transport device, wherein the rollers project into a projection area on each side of a catching area of the transport device;
   a first set of two rails connected to the support surface, one rail in each projection area on each side of the catching area, wherein the first set of rails are located nearer to the input chamber than a second set of rails;
   a second set of two rails connected to the support surface, one rail in each projection area on each side of the catching area, wherein the second set of rails is separated by a space from the first set of rails and located in the area of the detection array;
   a third set of two rails located in the space between the first and second set of two rails and above the rollers, one rail in each projection area on each side of the catching area;
   wherein the rollers rotate in a first direction about their longitudinal axes due to frictional engagement or positive locking with the first set of rails and the second set of rails, and wherein the rollers rotate in a second direction about their longitudinal axes due to frictional engagement or positive locking with the third set of rails.

2. The transport device of claim 1, wherein the sections of the rollers overlapping the projection areas have segments with smaller diameters than the sections of the rollers overlapping the catching area, wherein the segments of the rollers frictionally engage or positively lock with the second set of rails.

3. The transport device according to 1, wherein the rollers comprise alternating segments of larger and smaller diameters in the catching area such that empty packaging is carried on the larger diameter segments of the rollers.

4. The transport device according to 2, wherein the rollers comprise alternating segments of larger and smaller diameters in the catching area such that empty packaging is carried on the larger diameter segments of the rollers.

5. The transport device of claim 1, wherein the transport device is a bulk conveyor.

6. The transport device of claim 2, wherein the transport device is a bulk conveyor.

7. The transport device of claim 3, wherein the transport device is a bulk conveyor.

8. The transport device of claim 4, wherein the transport device is a bulk conveyor.

9. the transport device of claim 1, wherein the bulk conveyor has an angle of incidence between 600 and 850 with respect to the input chamber.

10. the transport device of claim 2, wherein the bulk conveyor has an angle of incidence between 600 and 850 with respect to the input chamber.

11. the transport device of claim 3, wherein the bulk conveyor has an angle of incidence between 600 and 850 with respect to the input chamber.

12. the transport device of claim 4, wherein the bulk conveyor has an angle of incidence between 60° and 85° with respect to the input chamber.

13. the transport device of claim 5, wherein the bulk conveyor has an angle of incidence between 60° and 85° with respect to the input chamber.

14. the transport device of claim 6, wherein the bulk conveyor has an angle of incidence between 60° and 85° with respect to the input chamber.

15. the transport device of claim 7, wherein the bulk conveyor has an angle of incidence between 60° and 85° with respect to the input chamber.

16. the transport device of claim 8, wherein the bulk conveyor has an angle of incidence between 60° and 85° with respect to the input chamber.

* * * * *